US011380112B2

United States Patent
Ye et al.

(10) Patent No.: US 11,380,112 B2
(45) Date of Patent: Jul. 5, 2022

(54) METHODS FOR ENCODING POINT CLOUD FEATURE

(71) Applicant: SHENZHEN DEEPROUTE.AI CO., LTD, Shenzhen (CN)

(72) Inventors: Maosheng Ye, Shenzhen (CN); Shuangjie Xu, Shenzhen (CN); Tongyi Cao, Guangzhou (CN)

(73) Assignee: SHENZHEN DEEPROUTE.AI CO., LTD, Shenzhen (CN)

( * ) Notice: Subject to any disclaimer, the term of this patent is extended or adjusted under 35 U.S.C. 154(b) by 46 days.

(21) Appl. No.: 16/953,711

(22) Filed: Nov. 20, 2020

(65) Prior Publication Data
US 2022/0164566 A1  May 26, 2022

(51) Int. Cl.
*G06V 20/64* (2022.01)
*G06K 9/62* (2022.01)
*G06V 10/88* (2022.01)
*G06T 17/00* (2006.01)

(52) U.S. Cl.
CPC ......... *G06V 20/647* (2022.01); *G06K 9/6232* (2013.01); *G06T 17/00* (2013.01); *G06V 10/88* (2022.01)

(58) Field of Classification Search
None
See application file for complete search history.

(56) References Cited

U.S. PATENT DOCUMENTS

2021/0012555 A1\* 1/2021 Zhou ..................... G06V 20/64

OTHER PUBLICATIONS

Y. Zhou et al. ; "Voxelnet: End-to-end learning for point cloud based 3D object detection;" 2018 Proceedings of the IEEE Conference on Computer Vision and Pattern Recognition, pp. 4490-4499 (Year: 2018).\*

\* cited by examiner

*Primary Examiner* — Peter Hoang
(74) *Attorney, Agent, or Firm* — Dorsey & Whitney LLP

(57) ABSTRACT

A method for encoding a point cloud feature includes: obtaining an original point cloud, generating point-wise hybrid scale voxel features by conducting hybrid scale voxelization on the original point cloud; generating voxel-wise attention features using spatial features and voxel features of points in a voxel at each voxel scale; aggregating the hybrid scale voxel features and the attention features to obtain voxel-wise projection scale information; and mapping the voxel-wise projection scale information to pseudo image features at projection scales. In this way, points can be retained during voxelization, and a feature encoding network is guided by the attention features to be more attentive to interrelationships between points in the voxels, thereby increasing accuracy of three-dimensional object detection.

17 Claims, 7 Drawing Sheets

METHODS FOR ENCODING POINT CLOUD FEATURE

TECHNICAL FIELD

The present disclosure relates to methods for encoding a point cloud feature, computer devices, and storage media.

BACKGROUND

Three-dimensional target detection is to identify and locate targets in a three-dimensional scene. A voxel-based PointNet feature extractor conducts two-dimensional voxelization of the point clouds, which can provide efficient detection. A conventional voxel feature encoder (VFE), first voxelizes data by setting maximum point number in each voxel and pre-allocating memory, and then, linear transformation and max pooling are conducted in each voxel to aggregate features. Then, pseudo image features are extracted according to physical locations of the voxels. However, there are points dropped stochastically during voxelization of the VFE, leading to tremendous information losses and instability prediction.

SUMMARY

According to various embodiments disclosed by the present application, methods for encoding a point cloud feature, computer devices, and storage media are provided.

A method for encoding a point cloud feature includes: obtaining an original point cloud, generating point-wise hybrid scale voxel features by conducting hybrid scale voxelization on the original point cloud; generating voxel-wise attention features using spatial features and voxel features of points in a voxel at each voxel scale; aggregating the hybrid scale voxel features and the attention features to obtain voxel-wise projection scale information; and mapping the voxel-wise projection scale information to pseudo image features at projection scales.

A computer device including a memory and one or more processors, wherein computer-readable instructions are stored in the memory, when executed by the one or more processors, causing the one or more processors to perform steps of: obtaining an original point cloud, generating point-wise hybrid scale voxel features by conducting hybrid scale voxelization on the original point cloud; generating voxel-wise attention features using spatial features and voxel features of points in a voxel at each voxel scale; aggregating the hybrid scale voxel features and the attention features to obtain voxel-wise projection scale information; and mapping the voxel-wise projection scale information to pseudo image features at projection scales.

One or more non-transitory computer-readable storage medium storing computer-readable instructions, when executed by the one or more processors, causing the one or more processors to perform steps of: obtaining an original point cloud, generating point-wise hybrid scale voxel features by conducting hybrid scale voxelization on the original point cloud; generating voxel-wise attention features using spatial features and voxel features of points in a voxel at each voxel scale; aggregating the hybrid scale voxel features and the attention features to obtain voxel-wise projection scale information; and mapping the voxel-wise projection scale information to pseudo image features at projection scales.

Details of one or more embodiments of the present application are set forth in the following drawings and description. Other features and advantages of the present application will become apparent from the description, drawings and claims.

BRIEF DESCRIPTION OF THE DRAWINGS

In order to more clearly describe technical solutions according to the embodiments of the present application, drawings that are required in the embodiments will be briefly introduced below. Apparently, the drawings in the following description are only some embodiments of the present application. For a person of ordinary skill in the art, other drawings can be obtained based on these drawings without creative work.

DETAILED DESCRIPTION OF THE EMBODIMENTS

In order to illustrate technical solutions and advantages of the present application clearer, the present application will be further described in detail below with reference to the accompanying drawings and embodiments. It should be understood that the specific embodiments described here are only used to explain the present application, and not to limit the present application.

Figure 1:
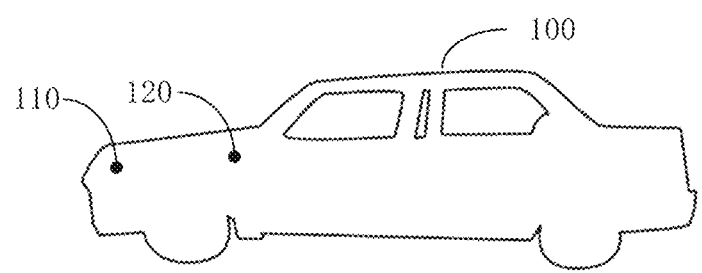
FIG. 1 is a view showing an application environment of a method for encoding a point cloud feature according to one or more embodiments.

A method for encoding a point cloud feature according to this application can be applied to an application environment as shown in FIG. 1. An autonomous vehicle 100 in FIG. 1 includes a lidar 110 and an in-vehicle computer 120. The lidar 110 scans a three-dimensional (3D) scene to obtain an original point cloud, and transmits the original point cloud to the in-vehicle computer 120. The in-vehicle computer 120 conducts hybrid scale voxelization on the original point cloud to generate point-wise hybrid scale voxel features, uses spatial features and voxel features of points in each voxel scale to generate voxel-wise attention features. The in-vehicle computer 120 aggregates hybrid scale voxel features and attention features to obtain voxel-wise projection scale information, and maps the voxel-wise projection scale information to pseudo image features at projection scales. The in-vehicle computer 120 conducts hybrid voxel scale feature fusion on pseudo image feature maps to generate multi-class features. The in-vehicle computer 120 predicts different classes of 3D object boxes based on the multiple-class features. During voxelization, points are retained, and a feature encoding network is guided by the attention features to be more attentive to associated information between points in the voxels. In this way, different classes of 3D objects can be quickly and accurately detected in the 3D scene.

The method for encoding a point cloud feature according to this application can also be applied to a robot. The robot includes a lidar and a computer. Where, the lidar of the robot can also be replaced with a 3D scanner, a depth camera or the like. The computer of the robot extracts hybrid scale voxel features by means of the in-vehicle computer in FIG. 1, and uses the hybrid scale voxel features to predict different classes of 3D object boxes. In this way, different classes of 3D objects can be quickly and accurately detected in the 3D scene.

Figure 2:
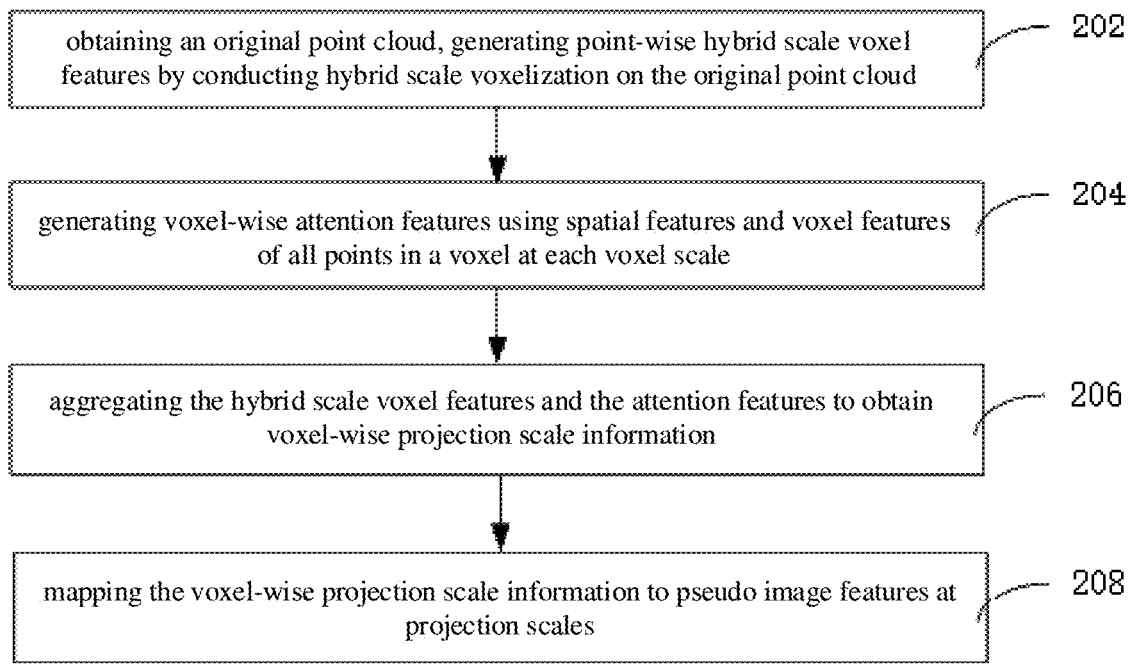
FIG. 2 is a schematic flowchart of a method for encoding a point cloud feature according to one or more embodiments.

In some embodiments, the method for encoding a point cloud feature may be executed by processing logic, which includes hardware (for example, circuits, dedicated logic, programmable logic, microcode, etc.), software (for example, instructions running on processing device) or a combination thereof. As shown in FIG. 2, the method for encoding a point cloud feature includes the following steps:

Step 202: obtain an original point cloud, generate point-wise hybrid scale voxel features by conducting hybrid scale voxelization on the original point cloud.

Step 204: generate voxel-wise attention features using spatial features and voxel features of points in a voxel at each voxel scale.

Step 206: aggregate the hybrid scale voxel features and the attention features to obtain voxel-wise projection scale information.

Step 208: map the voxel-wise projection scale information to pseudo image features at projection scales.

Figure 3:
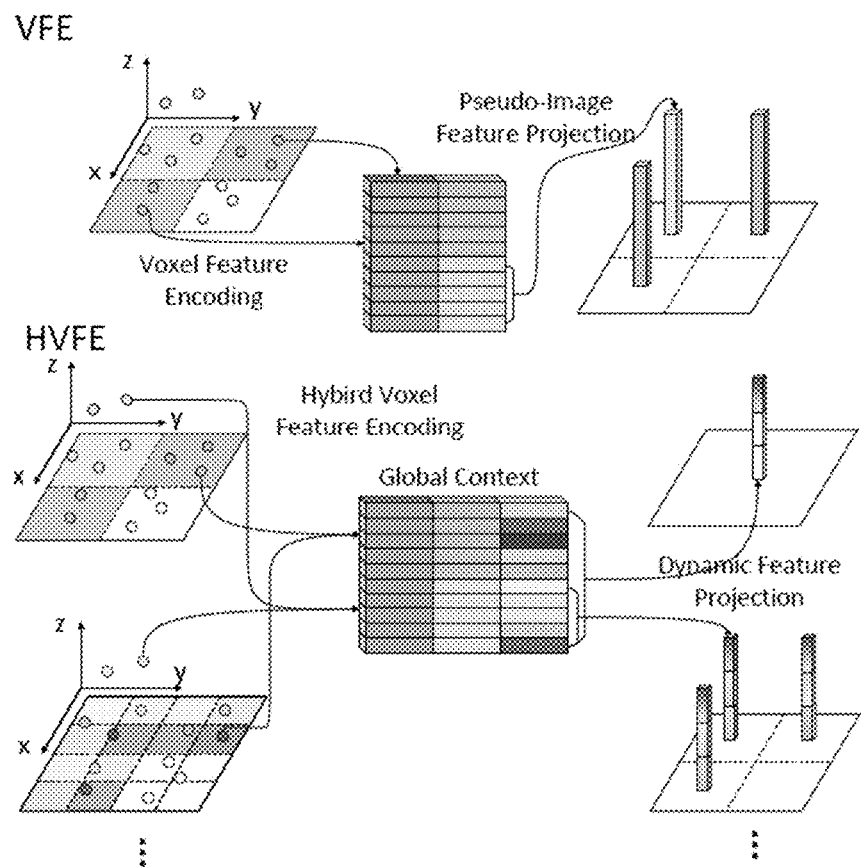
FIG. 3 is a schematic view showing voxel feature extraction in different networks according to one or more embodiments.

In a conventional feature extraction method, for example, in a voxel feature encoding (VFE) method, as shown in the VFE in FIG. 3, the original point cloud is voxelized via a specified two-dimensional voxel grid, and the voxel scale is fixed. The calculation of each point in the original point cloud depends on point-wise features of the grid, and the point-wise features are inputted into a feature encoder with a PointNet style. The point-wise features are aggregated into voxel-level features and projected back to their original grid to form pseudo image feature maps. There is only one voxel scale in the VFE method, and only one projection scale of the pseudo image feature maps. The features of each of the points in the VFE method only includes voxel features with a specified voxel scale. The size of the voxel is a key parameter in the VFE method. A smaller voxel can capture finer geometric feature and better locate an object that is detected, but require longer inference time. A coarser voxel leads to a smaller pseudo image feature map and faster inference speed, but has inferior performance, especially for smaller detected objects.

In this embodiment, a hybrid voxel feature extractor (HVFE) can have multiple voxel scales during voxelization, and the projection scale of the pseudo image when projecting may also be multiple or one. Where, multiple refers to two or more. The projection scale can be less than the voxel scale. As shown in the HVFE in FIG. 3, the HVFE aggregates the scale voxel features at the hybrid voxel scales into a global context, and then projects them to the pseudo image feature maps at dynamic projection scales. By decoupling voxel feature extraction and pseudo image feature map projection, the features extracted by the HVFE are effectively fused. The features of voxels are extracted, and the scales are compactly gathered in a point-wise manner to obtain higher computational efficiency and storage efficiency.

For example, a voxel scale set can be {0.1 m, 0.2 m, 0.4 m}, and the projection scale set is {0.4 m}. For a spatial area of 80 m×80 m, a pseudo image feature map of 200×200 can be finally obtained. For a general VFE, a feature map of 800×800 size is required to capture fine features at a voxel scale of 0.1 m.

It should be understood that although the various steps in the flowchart of FIG. 2 are displayed in sequence as indicated by arrows, these steps are not necessarily performed in sequence in the order indicated by the arrows. Unless explicitly stated herein, the performing of these steps is not strictly limited in order, and these steps can be performed in other orders. Moreover, at least a portion of the steps in FIG. 2 may include multiple sub-steps or multiple stages. These sub-steps or stages are not necessarily performed at the same time, but can be performed at different times. The performing sequence of these sub-steps or stages is not necessarily performed sequentially, but may be performed in turn or alternately with other steps or at least a portion of sub-steps or stages of other steps.

In some of the embodiments, in the method for encoding a point cloud feature, the hybrid voxel feature extractor (HVFE) uses multi-voxel scale to voxelize the space of the original point cloud, and allocates the corresponding multi-voxel scale voxels to each of the points in the original point cloud. One original point cloud can be represented as an undirected graph set $\{p_1, p_2, \ldots, p_N\}$, where $p_i \in \mathbb{R}^d$. Each of the points in the original point cloud consists of two parts, which are a 3D coordinates (x, y, z) of a point and point cloud features $f_i \in \mathbb{R}^{d+3}$ associated with that point. Assuming that a physical dimension that is detected is L×W×H, from $(x_{min}, y_{min}, z_{min})$ to $(x_{max}, y_{max}, z_{max})$. Voxelization refers to dividing the space with small grids, and matching points in the original point cloud with the ids of the divided grids. In some of prior methods, such as VoxelNet and PointPillar, a process corresponding to the id needs to allocate a space with corresponding capacity in memory in advance. If point number allocated in one grid exceeds preset capacity of the space, extra points will be dropped, which will cause information loss of some points, and the inference result cannot be reproduced. In this embodiment, in the hybrid scale voxelization stage, only the id of the voxel is recorded, and there is no need to pre-allocate a space with corresponding capacity in the memory in advance. Assuming that the point cloud space of the original point cloud is voxelized into a voxel set $V=\{V_j|j=1, \ldots, N_V\}$, where the size of each voxel is $V_L \times V_W \times V_H$. Where, $V_H$ is set to H. For target voxel at a voxel scale s, the point-wise index $c_i$ serves as a cursor, indicating the voxel id to which the point lies in, and which is represented as:

$$c_i^{(s)} = \left\lfloor \frac{(x_i - x_{min})}{V_H s} \right\rfloor \left\lfloor \frac{L}{V_L s} \right\rfloor + \left\lfloor \frac{(y_i - y_{min})}{V_W s} \right\rfloor \tag{1}$$

The point cloud space can be voxelized to different voxel scales with reference to the above method. Unlike MVF which need bidirectional relationships, in this application, only mapping relationship between points and voxels needs to be recorded to know the voxels to which each of the points lies in at different voxel scales. In the hybrid scale voxelization stage, only the index is spatially allocated. In the hybrid scale voxelization stage, the index set consisting of point-wise indexes at each voxel scale can be called a first index set. Compared with prior methods that limit the point number in each of the voxels, points in each voxel are retained in this application, which helps to improve the accuracy of target detection.

After the hybrid scale voxelization, scale voxel features of each of the points in the original point cloud at each voxel scale can be calculated. Where, point cloud features are low-dimensional features, and thus high-dimensional scale voxel features can be obtained by feature mapping. For example, a 3D point cloud feature $f_i$ can be mapped to an eight-dimensional scale voxel feature F via a matrix of 3*8. At different voxel scales, the scale voxel features F of the same point are different.

In a conventional method, take PointPillar as an example, a voxel-based method is limited to a fixed voxel scale s, thus the point cloud feature extracted each time only contains information on the voxel scale s. In addition, the size of the final projection feature is the same as the corresponding voxel size, which means that the computational complexity will rise rapidly with the addition of fine-grained voxel scale. Assuming that the features in the pseudo image feature map obtained by projection are represented as $I^s \in \mathbb{R}^{N_W \times N_L \times N_H}$, ($I^{sr}$ is referred to as pseudo image feature for short), where $N_L = \lfloor L/(V_L s) \rfloor$, $N_W = \lfloor W/(V_W s) \rfloor$ and $N_H$ is the projection output dimension. When s is reduced by n times, $N_W \times N_L$ will increase by $n^2$ times.

The HVFE encodes the point-wise scale voxel features at one of the voxel scales and scale voxel features of the same point at other voxel scales to generate point-wise hybrid scale voxel features. A point-wise scale voxel feature set at a voxel scale can be represented as $S_T = \{s_t | 1 < t < N_T\}$.

In some of the embodiments, in the method for encoding a point cloud feature, an attention mechanism voxel feature encoding (AVFE) layer encodes a voxel scale feature set, a first index set, and a first attention feature set at each voxel scale to generate a voxel scale feature collection, and aggregates the voxel scale feature collections at each voxel scale to generate point-wise hybrid scale voxel features. For example, a hybrid voxelization is conducted on the original point cloud to obtain the first index set $c^{S_T} = \{c_i^{(S_t)} | s_t \in S_T, i \in [1, N]\}$ consisting of first indexes. The scale voxel features of a voxel-wise point are aggregated to generate the first attention feature set. The features in the first attention feature set are represented by $G^{S_T}$, and the attention features of the same point have the same dimension as the scale voxel features. Where, the index of the voxel scale $s_{t+1}$ is represented as $c^{s_{t+1}}$; the voxel scale feature is represented as $F^{s_{t+1}}$; the attention feature is represented as $G^{s_{t+1}}$; the index of the voxel scale $s_t$ includes $c^{s_t}$; the voxel scale feature is represented as $F^{s_t}$; the attention feature is represented by $G^{s_t}$, and so on. The AVFE layer encodes F, $G^{S_T}$ and $c^{S_T}$ into a voxel scale feature collection $H^{S_T}$, where each voxel scale s has a feature $H^{S_T} \in \mathbb{R}^{N \times q}$. Then, $H^{S_T}$ is aggregated into a hybrid scale voxel feature $H \in \mathbb{R}^{N \times q}$ via tensor concatenation, where $e = 2qN_T$. It is validated by experiments that only limited $N_T$ of inputted hybrid scale voxel features are required, and enough scale information can be extracted via a dynamic feature projection to restore the information on the unknown voxel scale set $S_T$.

In some of the embodiments, in the method for encoding a point cloud feature, an attention mechanism voxel feature encoding output (AVFEO) layer restores projection scale information of point-wise hybrid scale voxel features, a second index set at each of projection scales, and a second attention feature set, and projects the restored projection scale information to the pseudo image feature map. The hybrid scale voxel feature H is a high-dimensional global scale feature, which has rich voxel scale information. Therefore, the projection scales in projection scale set $S_R = \{s_r | 1 < r < N_R\}$ of the pseudo image features may be out of voxel scale set $S_T$, and these unlearned scales will be projected and mapped by the feature H. In order to restore information at each projection scale $s_r$ from H during dynamic projection, some additional scale-related information needs to be used as guidance. The second index set $c^{S_R} = \{c^{(S_r)} | s_r \in S_R\}$, and the second attention feature set $G^{S_R}$ are pre-calculated before projection. Where, the second attention feature set is pre-calculated using the prior distribution of points in the original point cloud before projection. The index of the projection scale $s_{r+1}$ is represented as $c^{s_{r+1}}$; the attention feature is represented as $G^{s_{r+1}}$; the index of the projection scale $s_r$ includes $c^{s_r}$; the attention feature is represented as $G^{s_r}$, and so on.

The AVFEO layer takes the point-wise hybrid scale voxel features, the index and the attention features at each of projection scales as input, and restores the corresponding projection scale information, and projects the projection scale information to the corresponding pseudo image features. For example, the AVFEO layer takes H, $c^{s_r}$ and $G^{s_r}$ as input to restore information at projection scale $s_r$, and then projects the information at projection scale $s_r$ to the pseudo image features $I^{s_r}$. Like the AVFE layer, all layers in the AVFEO layer share parameters. In the dynamic feature projection, $G^{s_r}$ is the key for scale feature retrieval, and guides the AVFEO layer to be more attentive to project H into projection scale $s_r$. In addition, $c^{s_r}$ is used as an efficient implementation of the AVFEO layer.

In the conventional voxel feature encoding layer, the data is voxelized by setting the maximum point number in each voxel and pre-allocating memory. Then, linear transformation and max pooling are conducted in each voxel to aggregate features. Then, the pseudo image features are extracted according to the physical locations of the voxels. Although the VFE method provides a simple method for extracting the features of sparse point clouds, there are points dropped stochastically during voxelization, leading to tremendous information losses and instability prediction behaviors. Moreover, zero padding is conducted when point number is lower than limitation, which can greatly enlarge amounts of computation and memory consumption, and introduce additional information that is wrong.

In some embodiments, the hybrid voxel feature extractor includes: an attention mechanism voxel feature encoding (AVFE) layer and an attention mechanism voxel feature encoding output (AVFEO) layer. The AVFE layer is configured to encode voxel-wise attention features at each voxel scale. The encoded attention features are used to generate hybrid scale voxel features. AVFEO layer is configured to restore projection scale information. The projection scale information is projected into the pseudo image feature map.

As an expansion of the original point-wise features $p_i$, the attention features $g_j \in \mathbb{R}^q$ of the voxel $V_j$ is obtained by aggregating voxel-wise point features. Such attention features guide the feature encoding network to be more attentive to interrelationships between the points in the same voxel. Take calculating attention features of the voxel $V_j$ at voxel scale s as an example. Average spatial features are calculated using the spatial features of points in the voxel $V_j$, and average features are calculated via the voxel features of points in the voxel $V_j$. Moreover, 3D spatial features, average spatial features, point cloud features and average features are aggregated to generate point-wise attention features in the voxel $V_j$. The attention features G of the voxel $V_j$ are generated using the point-wise attention features in the voxel $V_j$.

Assuming that voxel cursor c is set for the point $p_i$ in the voxel $V_j$, the attention features $g_j$ of the point $p_i$ can be represented as:

$$g_i = \left(\left(x_i - \frac{\sum U_j x_k}{N_{U_j}}\right) \oplus f_i\right) \oplus \frac{\sum U_j p_k}{N_{U_j}} \quad (2)$$

Where, $\oplus$ represents tensor concatenation. The set $U_j$ is an index set of a series of points that lies in the same voxel as the point $p_i$, which is represented as $U_j=\{k|0<k<N \& c_k=c_i\}$.

Figure 4:
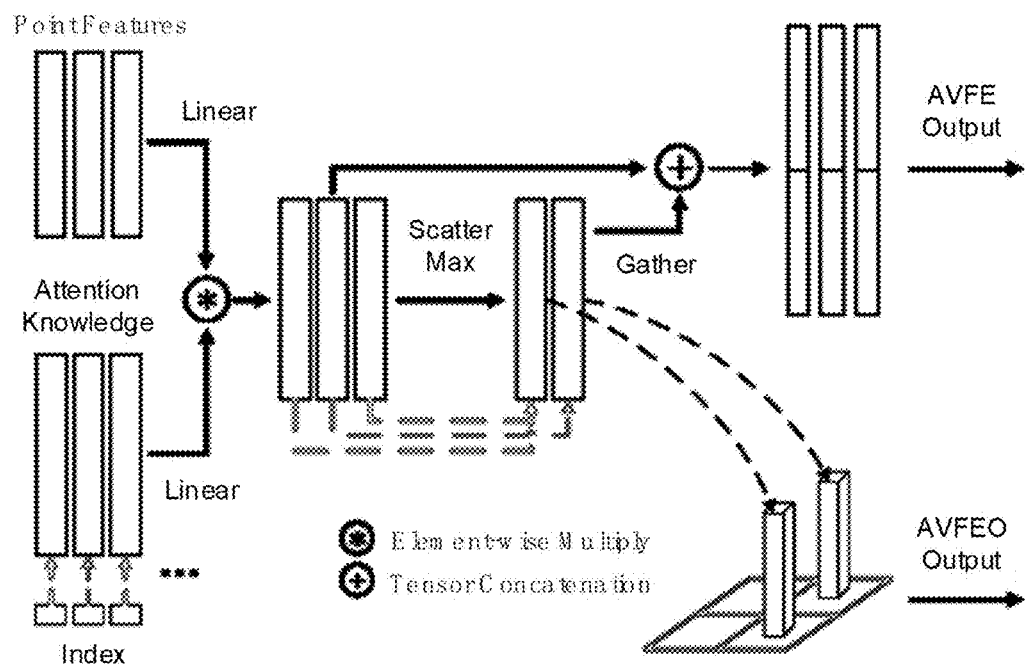
FIG. 4 is a schematic view showing an attention mechanism voxel feature encoding (AVFE) layer and an attention mechanism voxel feature encoding output (AVEFO) layer according to one or more embodiments.

During dynamic feature projection, as shown in FIG. 4, first, hybrid scale voxel features and attention features are conducted via a shared fully connected layer, followed by an element-wise matrix multiply to obtain mapping features. The mapping features are aggregated via a max pooling layer to obtain projection scale information. The projection scale information includes voxel-wise projection features $G' \in \mathbb{R}^{N \times q}$. For the AVFEO layer, each feature in the G' is mapped to be a point $(x_I^{s_r}, y_I^{s_r})$ on the pseudo image feature $I^{s_r}$, and which is represented as:

$$x_I^{s_r} = c_j^{s_r} | \left\lfloor \frac{W}{v_W s_r} \right\rfloor, \quad y_I^{s_r} = c_j^{s_r} \mod \left\lfloor \frac{W}{v_W s_r} \right\rfloor \quad (3)$$

Where, $s_r$ represents the projection scale, | represents exact division, mod represents modulo operation.

In some embodiments, the original point cloud is sparse data. This application proposes to convert the sparse matrix in the point clouds into a dense matrix of the corresponding index. The process of obtaining $U_j$ requires a large number of loops. It is validated by experiments that, whether hybrid voxel net (HVNet) is efficient is related to the calculation strategy performance of the index and the parallel scheduling efficiency of the entire network model. The key index-based propagation operators, Scatter and Gather, are implemented on graphics processing units (GPUs).

The Gather conducts feature aggregation of sparse point data within voxel and behave as tensor slice according to a cursor vector. The Scatter manipulates all values from source tensor according to the index specified in the given cursor, and finally, outputs via each of the different indexes, separately. In one of the embodiments, the Scatter Mean is used in the voxel-wise attention features, and the Scatter Max is used in the AVFE layer and AVFEO layer. Take the Scatter Max as an example, the corresponding equation is represented as:

out$_i$=max(out$_i$, max($\{src_j|c_j=i, j\in c\}$), where, out and src are output and source, respectively, c is an index that references each location of src. In the implementation of Scatter, atomic lock of the GPU Global Memory is used to ensure the reproducibility and consistency of argmax results.

Figure 5:
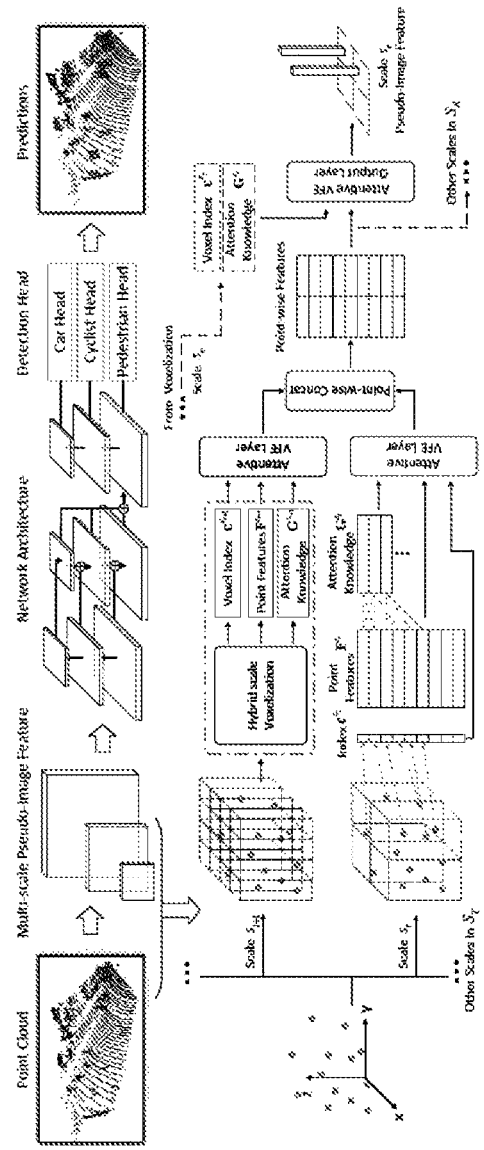
FIG. 5 is a schematic view showing an object detection network according to one or more embodiments.

In some of the embodiments, as shown in FIG. 5, the HVFE, a backbone network and a detection head form a single-stage 3D target detection network HVNet. The backbone network is used to conduct hybrid voxel scale feature fusion on the pseudo image feature map to generate multi-class features. The detection head is used to predict different classes of 3D object boxes via the multi-class features. In this way, it is possible to take into account inference time and capturing complex features, and quickly and accurately detect different classes of 3D objects in the 3D scene.

In some embodiments, the backbone network may be a 2D convolutional backbone network. The 2D convolutional backbone network includes a main network and a feature fusion pyramid network (FFPN). The main network aggregates pseudo image feature maps at multiple projection scales. The FFPN conducts class feature extraction on the aggregated features of the main network to obtain class-specific pyramid features.

In some embodiments, the main network includes a plurality of network blocks. The pseudo image feature maps at different projection scales are inputted into different network blocks. The next projection scale is a preset multiple of the previous projection scale. For example, the projection scale is represented as $s_{r+1}=2s_r$. Convolutional layers in different network blocks can be partially the same or completely different. Starting from the second network block, the first layer in the network block reduces the space capacity of pseudo image features by convolution of specified strides. For example, the specified stride can be 2×2.

Figure 6:
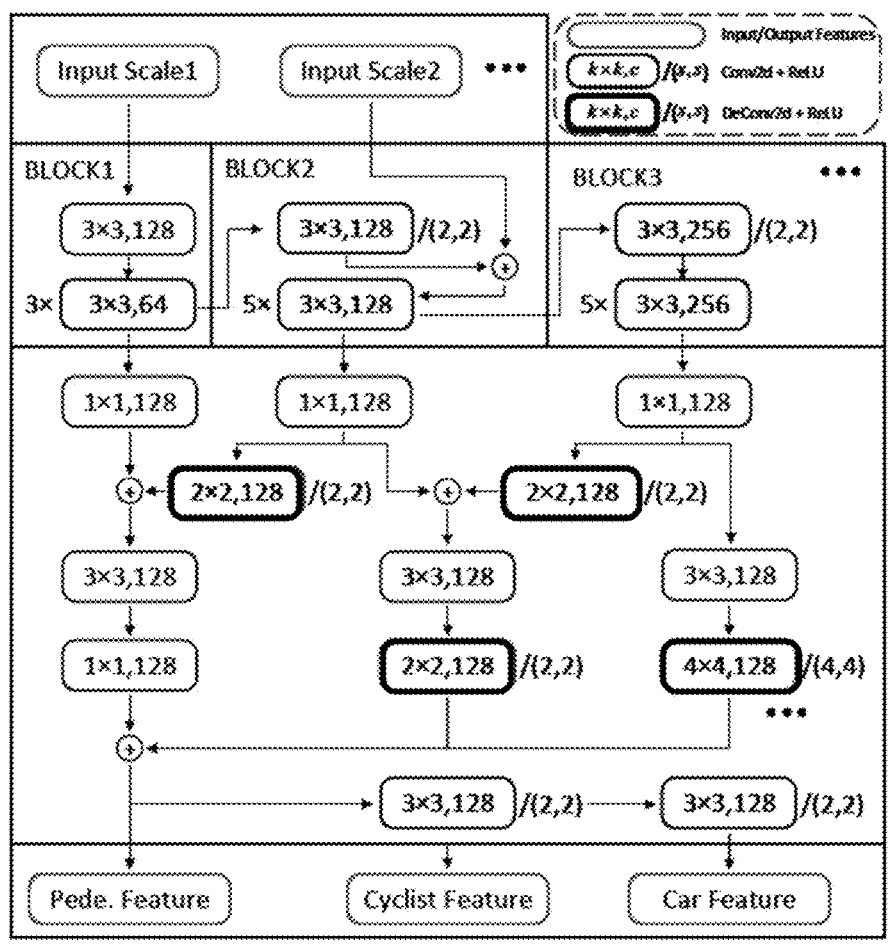
FIG. 6 is a schematic view showing network structure of a backbone network according to one or more embodiments.

Take the main network including 3 network blocks as an example. The network structure of the 2D convolutional backbone network is shown in FIG. 6. The network block 1 takes pseudo image feature maps $I^{s_1}$ as input, conducts a convolution, and takes the results of the convolution as aggregated features of the network block 1. The network block 2 aggregates the pseudo image feature maps $I^{s_2}$ and the aggregated features outputted by the network block 1. When there are more network blocks, the latter network block aggregates the aggregated features of the previous network block and the pseudo image feature map at the next projection scale, and outputs aggregated features of the latter network block, and so on. For the last network block, such as the network block 3 in FIG. 6, the convolution can only be conducted on the aggregated features of the previous network block, and the results of the convolution are taken as the aggregated features of the network block 3. The aggregated features $B_1 \in \mathbb{R}^{N_w \times N_L \times C_1}$, $$B_2 \in \mathbb{R}^{\frac{N_w}{2} \times \frac{N_L}{2} \times C_2}, \quad B_3 \in \mathbb{R}^{\frac{N_w}{4} \times \frac{N_L}{4} \times C_3}$$

of the three network blocks are taken as the input of FFPN.

This application provides a scale fusion pyramid network with enhanced performance than the FPN network. Different from a conventional method of feature fusion from top to bottom layer by layer, in this application, the scale fusion pyramid network concatenates the aggregated features of the network blocks at the smallest projection scale to obtain intermediate features, and uses the convolutional layers with different strides and the intermediate features to obtain the class-specific pyramid features. The intermediate features $B_f$ are represented as:

$$B_f = \Sigma_{i=1}^{N_B} \Psi_i(B_i + 1_{i<N_B}\Gamma_{i+1}(B_{i+1})) \quad (4)$$

Where, + represents tensor concatenation, 1 represents an indicator function; $N_B$ represents the number of $B_i$; $\Gamma_i$ represents a deconvolution function for the aggregated features $B_i$ of each inputted network block for dimension alignment before matrix concatenation. The class-wise pyramid features can be represented as:

$$B_o^{(i)} = \gamma_i(B_f) \quad (5)$$

Where, $\gamma_i$ represents convolutional layers with different strides. Compared with a feature fusion single shot multibox detector (F-SSD), in this application, features are fused in two stages: 1) the intermediate features are layer by layer fused, as shown in equation (4); 2) multiple down-sample convolutional layers are adopted in the fusion process. The class-specific pyramid features can be obtained in one forward propagation. For example, $B_o^{(1)}$ represents pyramid features of pedestrian category, $B_o^{(2)}$ represents pyramid features of cyclist category, and $B_o^{(3)}$ represents pyramid features of car category.

In some embodiments, the detection head may be a detection head in an SSD network. A positive anchor box is selected and matched by calculating Rotated Intersection over Union (RIoU) in bird eye view (BEV) via an anchor box and a labeled real box. Each pyramid feature is subjected to 3 parallel convolutional layers of 3×3, $\phi_c^{(i)}$, $\phi_l^{(i)}$, and $\phi_h^{(i)}$ to obtain a classification probability, a vertex position offset and a height regression corresponding to each anchor box, respectively, whose output in the BEV are $N_{anc} \times N_{cls}$, $N_{anc} \times 8$, and $N_{anc} \times 2$ which is a center on the z-axis and a height.

Most voxel-based methods predict the center (x, y), length, width and height, and deflection angles (w, h, l, θ) of a box. However, the HVNet uses the vertex position offset of the real box and the anchor as an objective function of the location, which is represented as $\overrightarrow{\Delta cor} = \{\Delta \vec{x}_l, \Delta \vec{y}_l | i=1, 2, 3, 4\}$. Δcor represents a vector of $\mathbb{R}^8$. Assuming that a location branch $\phi_l$ predicts the offset Δcor, localization regression loss function can be given by $\mathcal{L}_{loc} = \Sigma$ Smooth L1($\overrightarrow{\Delta cor} - \Delta cor$). For a classification branch $\phi_c$, given class probability $p_a$ of an anchor, focal loss function is used to address the imbalance of the number of samples between positive samples and negative samples, which is represented as $\mathcal{L}_{cls} = -\alpha(1-p_a)^\gamma \log(p_a)$. In addition, given prediction z,h from branch $\phi_h$, the loss in a vertical direction is represented as $\mathcal{L}_h = \Sigma_{b \in (z,h)} \text{SmoothL1}(\Delta b)$.

Therefore, the final loss function is the weight of the three:

$$\mathcal{L} = \frac{1}{N_{pos}}(\lambda_{loc}\mathcal{L}_{loc} + \lambda_{cls}\mathcal{L}_{cls} + \lambda_h\mathcal{L}_h) \quad (6)$$

Evaluation experiments of the HVNet on KITTI data set are as follows.

The KITTI data set consists of 7,481 training data and 7,518 testing data, as well as corresponding point clouds of categories of cars, pedestrians and cyclists. The KITTI metric is defined as the average precision (AP) over 40 recall positions on the P-R curve. According to object size, occlusion and truncation levels, labels are divided into three subsets (easy, moderate, and hard). The physical detection range is from (0, -32, -3) to (64, 32, 2). The size of the basic voxel is $V_L$=0.2, $V_W$=0.2, thus the resolution of the pseudo image is 320×320. In the encoding and decoding process, the scale sets are $S_T$={0.5,1,2} and $S_R$={1,2,4}, respectively. Besides, the feature dimension is q=64 for $H^{S_T}$, and $N_H$=128 for $I^{S_t}$. The size of the anchor box is designed as: [0.8,0.8, 1.7] for pedestrian, [0.8,1.8,1.5] for cyclist, [1.7,3.5,1.56] and [2.0,6.0,1.56] for car. Each class has the same anchor box orientation in [0, π/4, π/2, 3π/4]. In the training process, anchor boxes that have RIoU with the labeled boxes respectively larger than [0.35,0.35,0.5] for pedestrian, cyclist and car are selected as positive samples, and those lower than [0.25;0.25;0.35] are selected as negative samples. In the testing stage, the threshold of prediction score is greater than 0.2, and the threshold of rotation non-maximum suppression (NMS) is set to [0.75,0.75,0.25]. In the loss function design stage, α and γ for focal loss function are set to [0.75,0.75, 0.25] and [2,2,2], respectively. The weights of the loss function are $\lambda_{loc}$=1, $\lambda_{cls}$=1, $\lambda_h$=1.5, respectively. The HVNet is iterated for 70 epochs with an Adam optimizer, the initial learning rate is $1_r$=2e$^{-4}$ with the weight decay of 1e$^{-4}$. A warmup strategy is adopted, a total of 300 warmup iterations is conducted, and the change in the warmup learning ratio is 1/3. In addition, the learning rate decays to 0.1 in the 40th and 60th epoch, respectively.

Before training, a 3D data enhancement will be conducted on the point cloud data. A Global random flipping, rotation, scaling, and translation are applied to the whole point cloud data. Where, the flipping probability is set to 0.5; the rotation angle ranges are normal distribution from [-π/2, π/2]; the scaling ratio is between [0.95, 1.05]; the random translation (x,y,z) obeys a normal distribution with a mean value of 0 and standard deviation of [0.2,0.2,0.2]. According to the setting in SECOND, except boxes which have physical collision with boxes in the current frame, several new boxes, where 8 for cyclist, 8 for pedestrian, and 15 for car, will be fixed into current training frame according to the labeled box and the corresponding points in the corresponding frame thereof.

TABLE 1

| Method | Speed (Hz) | Input L | I | Car BEV AP(%) Easy | Moder. | Hard | Pedestrian BEV AP(%) Easy | Moder. | Hard | Cyclist BEV AP(%) Easy | Moder. | Hard |
|---|---|---|---|---|---|---|---|---|---|---|---|---|
| F-PointNet | 5.9 | ✓ | ✓ | 91.17 | 84.67 | 74.77 | 57.13 | 49.57 | 45.48 | 77.26 | 61.37 | 53.78 |
| AVOD-FPN | 10 | ✓ | ✓ | 90.99 | 84.82 | 79.62 | 58.49 | 50.32 | 46.98 | 69.39 | 57.12 | 51.09 |
| MMF | 12.5 | ✓ | ✓ | 93.67 | 88.21 | 81.99 | N/A | N/A | N/A | N/A | N/A | N/A |
| IPOD | 5 | ✓ | | 89.64 | 84.62 | 79.96 | 60.88 | 49.79 | 45.43 | 78.19 | 59.40 | 51.38 |
| F-ConvNet | 2.1 | ✓ | | 91.51 | 85.84 | 76.11 | 57.04 | 48.96 | 44.33 | 84.16 | 68.88 | 60.05 |
| STD | 12.5 | ✓ | | 94.74 | 89.19 | 86.42 | 60.02 | 48.72 | 44.55 | 81.36 | 67.23 | 59.35 |
| PointRCNN | 10 | ✓ | | 92.13 | 87.39 | 82.72 | 54.77 | 46.13 | 42.84 | 82.56 | 67.24 | 60.28 |
| Fast Point R-CNN | 16.7 | ✓ | | 90.87 | 87.84 | 80.52 | N/A | N/A | N/A | N/A | N/A | N/A |
| SECOND | 20 | ✓ | | 89.39 | 83.77 | 78.59 | 55.99 | 45.02 | 10.93 | 76.50 | 56.05 | 49.45 |
| HRI-VoxelFPN | 50 | ✓ | | 92.75 | 87.21 | 79.82 | N/A | N/A | N/A | N/A | N/A | N/A |
| PointPillars | 42.4 | ✓ | | 90.07 | 86.56 | 82.81 | _57.60_ | 48.64 | 45.78 | 79.90 | 62.73 | 55.58 |
| PIXOR++ | 35 | ✓ | | _93.28_ | 86.01 | 80.11 | N/A | N/A | N/A | N/A | N/A | N/A |
| HVNet | 31 | ✓ | | 92.83 | _88.82_ | _83.38_ | 54.84 | _48.86_ | _46.33_ | _83.97_ | 71.17 | 63.65 |

The experimental results are as shown in Table 1, the performance of each network in the bird eye view on KITTI data set are tested. 'L' represents the input of the LiDAR, 'I' represents RGB images. By way of evaluating 40 recall locations, results thereof are compared with the detectors on the KITTI leaderboard. These methods are categorized into three types: methods based on LiDAR and images, two-stage methods based only on liDAR, and one-stage methods based only on liDAR. The results in bold are the best of all methods, and the results in italics are the best of the one-stage methods. As can be seen from the table, the HVNet has better performance than all other methods in terms of overall mAP and cyclist. Even compared with the two-stage methods, the HVNet can provide good performance for the detection of cars and pedestrians while ensuring real-time operation. In the one-stage methods, the HVNet has reached advanced levels in both cars and cyclists.

Figure 7:
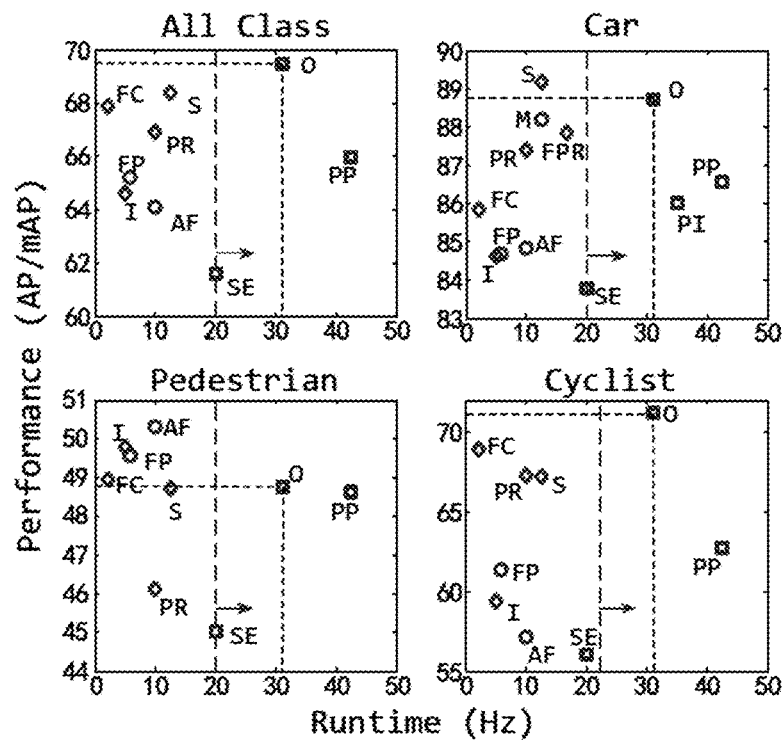
FIG. 7 is a schematic view showing bird eye view performance vs speed on KITTI data set according to one or more embodiments.

The performance vs speed of bird eye view of each of the methods on the KITTI data in Table 1 set is shown in FIG. 7. Where, the multi-sensor method is drawn as a circle, the two-stage method based on liDAR is drawn as a green diamond, and the one-stage method is drawn as a red square. The method to the right of the first vertical dotted line is real-time. The methods should be at least 20 Hz, because in-vehicle applications should cover 360 degrees rather than 90 degrees as limited by the KITTI data set. The HVNet can reach real-time speed (31 Hz) during inference.

Figure 8:
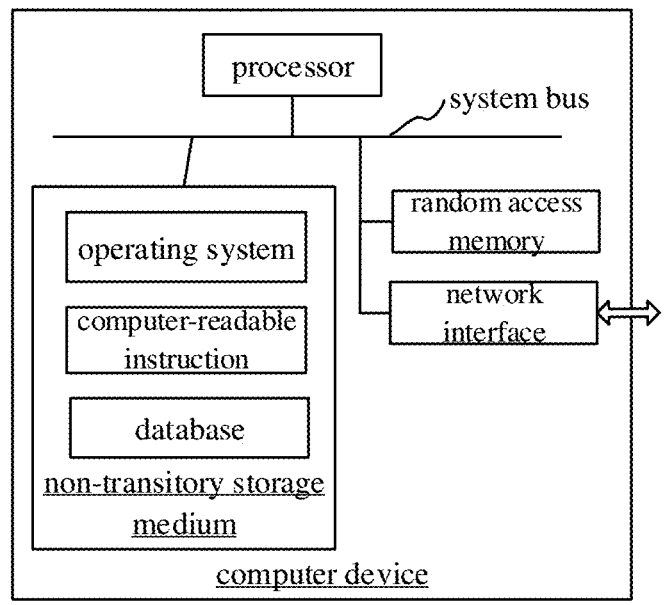
FIG. 8 is a block diagram of a computer device according to one or more embodiments.

In one embodiment, a computer device is provided. The computer device may be an in-vehicle computer of an autonomous vehicle, a computer of a robot, or the like, and internal structure thereof may be as shown in FIG. 8. The computer device includes a processor, a memory, a network interface and a database connected by a system bus. Where, the processor of the computer device is configured to provide calculation and control capabilities. The memory of the computer device includes a non-transitory storage medium and a Random Access Memory (RAM). The non-transitory storage medium stores an operating system, computer-readable instructions, and a database. The RAM provides an environment for the operation of the operating system and computer-readable instructions in the non-transitory storage medium. The database of the computer device is configured to store original point cloud data and pseudo image feature maps. The network interface of the computer device is configured to communicate with an external terminal via a network connection. The computer-readable instructions are executed by the processor to realize a target detection method.

Those skilled in the art can understand that the structure shown in FIG. 7 is only a block diagram of portion of the structure related to the solution of the present application, and does not constitute a limitation on the computer device to which the solution of the present application is applied. The specific computer device may include more or less components than shown in the figure, or combining some components, or having a different components arrangement.

A person of ordinary skill in the art can understand that all or part of the processes in methods according to the aforementioned embodiments can be implemented by instructing relevant hardware via computer-readable instructions, which can be stored in a readable storage medium of a non-transitory computer. When the computer-readable instructions are executed, the processes of the methods according to the aforementioned embodiments may be included. Where, any reference to memory, storage, database or other medium used in the embodiments according to this application may include a non-transitory memory and/or a transitory memory. The non-transitory memories may include read-only memory (ROM), programmable ROM (PROM), electrically programmable ROM (EPROM), electrically erasable programmable ROM (EEPROM), or flash memory. The transitory memory may include random access memory (RAM) or external cache memory. As an illustration and not a limitation, RAM is available in many forms, such as static RAM (SRAM), dynamic RAM (DRAM), synchronous DRAM (SDRAM), double data rate SDRAM (DDRS-DRAM), enhanced SDRAM (ESDRAM), synchlink DRAM (SLDRAM), Rambus direct RAM (RDRAM), direct memory bus dynamic RAM (DRDRAM), memory bus dynamic RAM (RDRAM), and the like.

The technical features of the aforementioned embodiments can be combined arbitrarily. In order to simply the description, all possible combinations of the technical features in the aforementioned embodiments are not described. However, as long as there is no contradiction in the combinations of these technical features, they should be considered to be fallen into the range described in the present specification.

Only several implementations of the present application are illustrated in the aforementioned embodiments, and the description thereof is relatively specific and detailed, but it should not be understood as a limitation on the scope of the present application. It should be noted that for those of ordinary skill in the art, without departing from the concept of the present application, several modifications and improvements can be made, which all fall within the protection scope of the present application. Therefore, the protection scope of the present application shall be subject to the appended claims.

What is claimed is:

1. A method for encoding a point cloud feature, the method comprising:
    obtaining an original point cloud;
    generating point-wise hybrid scale voxel features by conducting hybrid scale voxelization on the original point cloud;
    generating voxel-wise attention features using spatial features and voxel features of points in a voxel at each voxel scale;
    aggregating the point-wise hybrid scale voxel features and the voxel-wise attention features to obtain voxel-wise projection scale information; and
    mapping the voxel-wise projection scale information to pseudo image features at projection scales,
    wherein generating the point-wise hybrid scale voxel features includes encoding point-wise scale voxel features at one of the voxel scales and scale voxel features of the same point at other voxel scales to generate the point-wise hybrid scale voxel features.

2. The method according to claim 1, wherein the conducting the hybrid scale voxelization on the original point cloud comprises:
    using multi-voxel scale to voxelize a space of the original point cloud; and
    allocating corresponding multi-voxel scale voxels to each of points in the original point cloud.

3. The method according to claim 1, wherein the generating the voxel-wise attention features via the spatial features and the voxel features of the points in the voxel at each of the voxel scales comprises:
    generating point-wise attention features using the spatial features, point cloud features, and the voxel features of each of the points in a same voxel; and generating the voxel-wise attention features using the point-wise attention features in the same voxel.

4. The method according to claim 3, wherein the generating point-wise attention features using the spatial features, the point cloud features, and the voxel features of each of the points in the same voxel comprises:
calculating average spatial features of a voxel using the spatial features of the points in the same voxel;
calculating average features of a voxel using the voxel features of the points in the same voxel; and
generating the point-wise attention features by aggregating the spatial features, the average spatial features of the voxel, the point cloud features, and the average features of the voxel of each of the points in the same voxel.

5. The method according to claim 4, wherein the calculating average spatial features of the voxel using the spatial features of the points in the same voxel comprises:
calculating average spatial features using index set of the points in the same voxel and the spatial features of the points in the same voxel.

6. The method according to claim 4, wherein calculating average features of the voxel via the voxel features of the points in the same voxel comprises:
calculating average features of the points in the same voxel using index set of the points in the same voxel and the voxel features of the points in the same voxel.

7. The method according to claim 1, wherein the aggregating the point-wise hybrid scale voxel features and the voxel-wise attention features comprises:
generating mapping features using the point-wise hybrid scale voxel features and the voxel-wise attention features; and
aggregating the mapping features in a same voxel via a maximum pooling layer to obtain projection scale information.

8. The method according to claim 5, wherein the index set is obtained via a calculation of index-based propagation operators.

9. The method according to claim 8, wherein the index-based propagation operators comprise Scatter and Gather.

10. The method according to claim 9, wherein the voxel-wise attention features use Scatter Max in the Scatter operation.

11. A computer device, comprising:
a memory; and
one or more processors;
wherein computer-readable instructions are stored in the memory, when executed by the one or more processors, causing the one or more processors to perform a method comprising:
obtaining an original point cloud;
generating point-wise hybrid scale voxel features by conducting hybrid scale voxelization on the original point cloud;
generating voxel-wise attention features using spatial features and voxel features of points in a voxel at each voxel scale;
aggregating the point-wise hybrid scale voxel features and the voxel-wise attention features to obtain voxel-wise projection scale information;
mapping the voxel-wise projection scale information to pseudo image features at projection scales; and
encoding point-wise scale voxel features at one of the voxel scales and scale voxel features of the same point at other voxel scales to generate the point-wise hybrid scale voxel features.

12. The computer device according to claim 11, wherein when the computer-readable instructions are executed by the one or more processors, causing the one or more processors to further perform:
generating point-wise attention features using the spatial features, point cloud features, and the voxel features of each of the points in a same voxel; and
generating the voxel-wise attention features using the point-wise attention features in the same voxel.

13. The computer device according to claim 12, wherein when the computer-readable instructions are executed by the one or more processors, causing the one or more processors to further perform:
calculating average spatial features of a voxel using the spatial features of the points in the same voxel;
calculating average features of a voxel via the voxel features of the points in the same voxel; and
generating the point-wise attention features using the spatial features, the average spatial features of the voxel, the point cloud features and the average features of the voxel of each of the points in the same voxel.

14. The computer device according to claim 11, wherein when the computer-readable instructions are executed by the one or more processors, causing the one or more processors to further perform:
generating mapping features via the point-wise hybrid scale voxel features and the voxel-wise attention features; and
aggregating the mapping features in a same voxel via a maximum pooling layer to obtain projection scale information.

15. One or more non-transitory computer-readable storage medium storing computer-readable instructions, when executed by the one or more processors, causing the one or more processors to perform a method comprising:
obtaining an original point cloud;
generating point-wise hybrid scale voxel features by conducting hybrid scale voxelization on the original point cloud;
generating voxel-wise attention features using spatial features and voxel features of points in a voxel at each voxel scale;
aggregating the point-wise hybrid scale voxel features and the voxel-wise attention features to obtain voxel-wise projection scale information;
mapping the voxel-wise projection scale information to pseudo image features at projection scales; and
encoding point-wise scale voxel features at one of the voxel scales and scale voxel features of the same point at other voxel scales to generate the point-wise hybrid scale voxel features.

16. The storage medium according to claim 15, wherein when the computer-readable instructions are executed by the one or more processors, causing the one or more processors to further perform:
generating point-wise attention features using the spatial features, point cloud features, and the voxel features of each of the points in a same voxel; and
generating the voxel-wise attention features using the point-wise attention features in the same voxel.

17. The storage medium according to claim 15, wherein when the computer-readable instructions are executed by the one or more processors, causing the one or more processors to further perform:
generating mapping features via the point-wise hybrid scale voxel features and the voxel-wise attention features; and aggregating the mapping features in a same voxel via a maximum pooling layer to obtain projection scale information.

* * * * *